Figure 2:
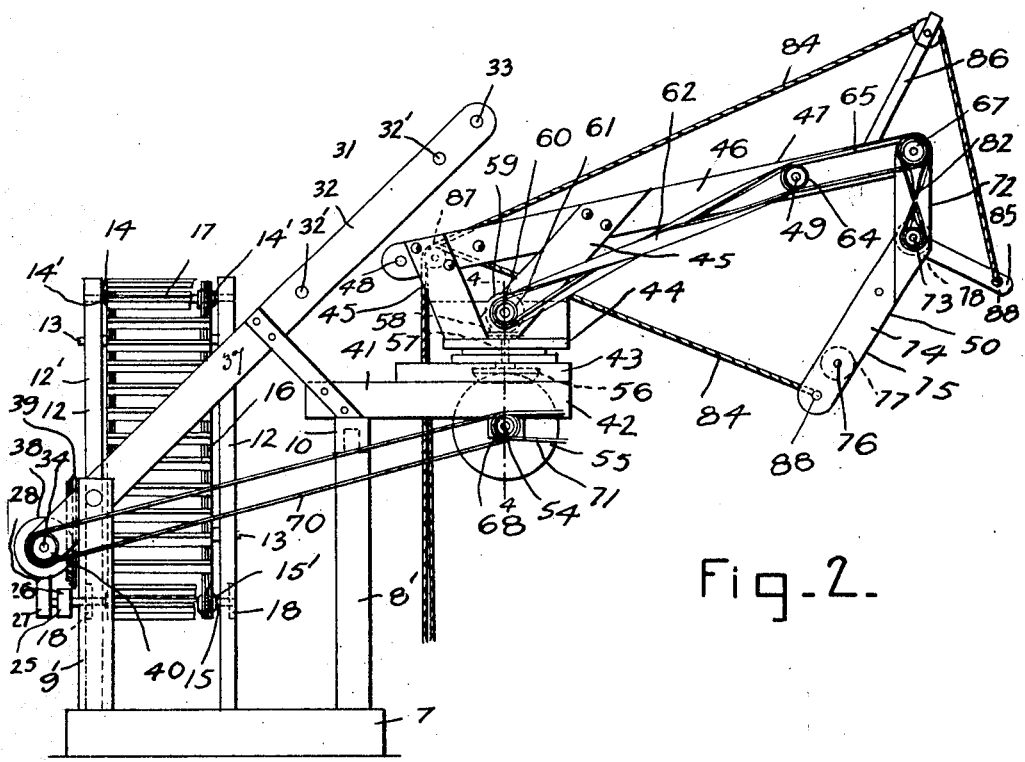

No. 885,541.

PATENTED APR. 21, 1908.

F. F. SOMMER.
HAY ELEVATOR.
APPLICATION FILED FEB. 18, 1907.

3 SHEETS—SHEET 1.

Fig. 1.

Witnesses
M. W. Rockwell
H. C. McEntury

Inventor
Frederick F. Sommer
By Chandler & Chandler
Attorneys

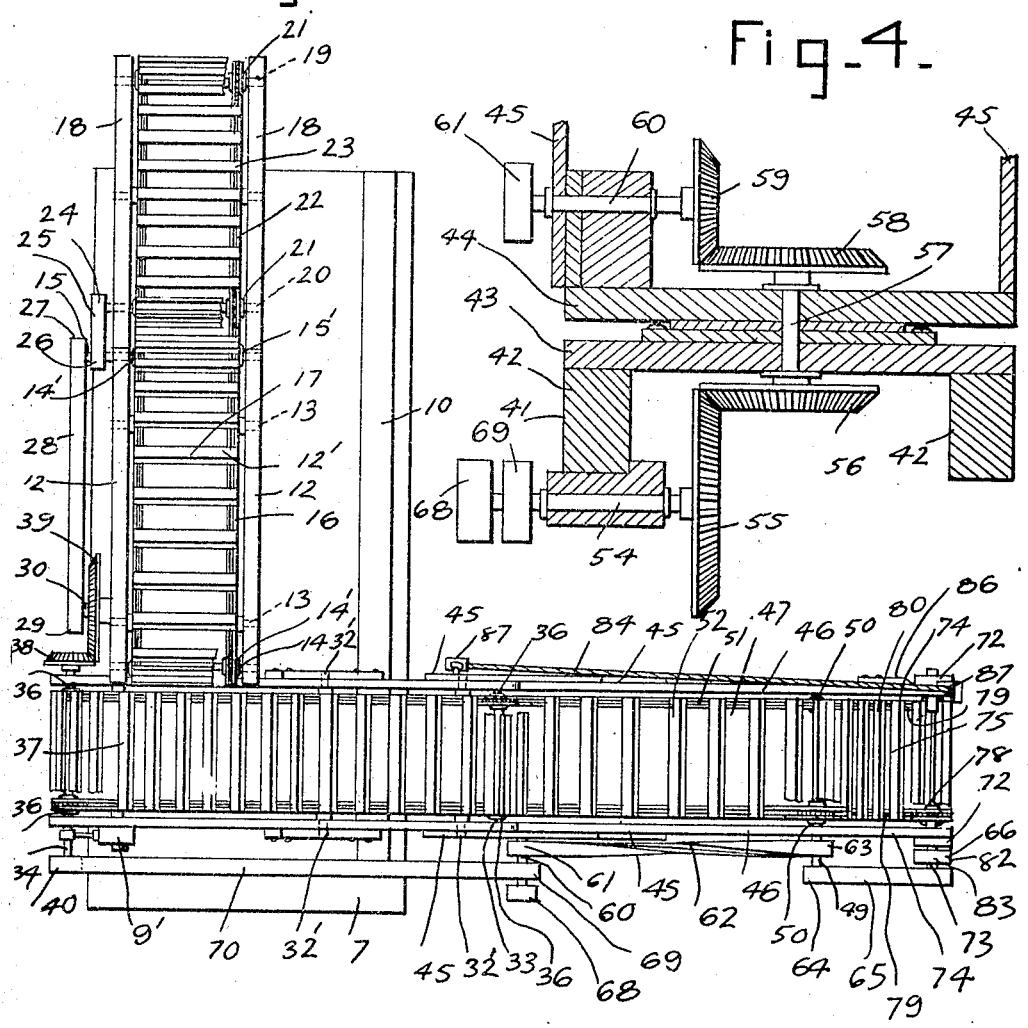

UNITED STATES PATENT OFFICE.

FREDERICK F. SOMMER, OF KALONA, IOWA.

HAY-ELEVATOR.

No. 885,541.  Specification of Letters Patent.  Patented April 21, 1908.

Application filed February 18, 1907. Serial No. 357,932.

*To all whom it may concern:*

Be it known that I, FREDERICK F. SOMMER, a citizen of the United States, residing at Kalona, in the county of Washington, State of Iowa, have invented certain new and useful Improvements in Hay-Elevators; and I do hereby declare the following to be a full, clear, and exact description of the invention, such as will enable others skilled in the art to which it appertains to make and use the same.

The present invention relates to improvements in hay elevators, and it aims to provide a simple, strong, and durable machine of that class designed for the purpose of quickly and effectually conveying hay or other material from a point near the ground surface, exterior to a barn or storage-house, into the top of the latter, and for discharging such material therein at different points, so as to provide as far as possible, its even distribution.

With this end in view, the invention comprises a flight of elevators mounted upon a supporting platform, the uppermost elevator, which extends into the storage chamber, being so mounted with respect to the preceding elevator as to be capable of a swinging movement in an approximately horizontal plane, so as to vary its points of discharge.

The invention further contemplates the provision of a vertically movable elevator connected to the discharge end of the swinging elevator above referred to and extending rearwardly directly therebeneath, so that grain may be finally discharged at practically any point in the storage chamber, so as to provide for its even distribution therewithin.

The invention further consists in the construction, combination, and arrangement of parts, all as hereinafter more fully described, specifically claimed, and illustrated in the accompanying drawings, in which like parts are designated by corresponding reference numerals in the several views.

Of the said drawings—Figure 1 is a front elevation of the improved machine. Fig. 2 is a side elevation thereof. Fig. 3 is a top plan view. Fig. 4 is a vertical sectional view on the line 4—4 of Fig. 2, showing the power transmitting gears.

Referring more particularly to the drawings, the machine is shown as having its operating parts mounted upon a platform 7, which is adapted to be positioned adjacent the barn or storage-house into which the hay or other material is to be transported. This supporting platform is provided at opposite sides with pairs of uprights 8, 8', and 9, 9', upon the upper ends of which are mounted the longitudinal sills 10 and 11, respectively. The sill 11 is of considerably less length than the sill 10 and is disposed in a plane somewhat below that in which the latter lies. The platform 7 is further provided with an upwardly inclined elevator frame 12', comprising a pair of spaced beams 12, connected by a transverse cross-beam 13, and by upper and lower shafts 14 and 15, disposed parallel with the cross-beam. The outer beam 12 of said frame is supported centrally by the sill 11, against the beveled end of which it rests. The upper shaft 14 of the elevator frame is provided with a pair of sprocket wheels 14', disposed adjacent the beams 12, while the lower shaft 15 carries a pair of sprocket wheels 15' mounted thereon in a similar manner, the said sprockets being connected by the chains 16 of the slatted elevator 17.

Projecting laterally from the beams 12 of the frame 12' is a pair of horizontally-disposed beams 18, which form the frame, upon which the lowermost member of the flight of elevators hereinafter described is supported. The beams 18 are provided at opposite ends with the transversely disposed connecting shafts 19 and 20, each of which carries a pair of sprocket wheels 21, over which the chains 22 of the slatted elevator 23 travel, the said sprocket wheels being disposed upon their shafts similarly to the sprocket wheels 14' and 15', above referred to. The shaft 20 at its outer end projects beyond the corresponding beam 18 and carries thereon a belt-pulley 24, connected by a belt 25, which passes around a similar pulley 26, mounted upon the projecting end of the shaft 15, which last-mentioned shaft is further provided at such point with a second pulley 27, driven by a belt 28, whose opposite end passes around a pulley 29, mounted upon a shaft 30, journaled in the upright 9.

The end of the sill 11, opposite from that against which the beam 12 rests, is reduced, as shown in Fig. 1, and passes through the spaced beams 31, which form the body or frame of an elevator 32, the lower end of which is disposed directly beneath the discharge end of the elevator 17. The frame beams 31 are, in like manner, connected by a pair of cross-beams 32', disposed approximately centrally thereof, and are further connected at their upper and lower ends by a pair of shafts 33 and 34, each of which carries a pair of sprocket wheels 36, over which the chains of the slatted elevator 37 travel. The lower shaft 34 of this last-mentioned elevator projects at opposite ends beyond the corresponding frame beams 31, and carries upon one end a beveled pinion 38, in mesh with a larger pinion 39 mounted upon the shaft 30. The opposite end of shaft 34 carries a belt-pulley 40.

The sill 10 of the supporting platform carries on its upper face an outwardly-extending supplemental platform 41, comprising a pair of spaced beams 42, which project laterally from said sill, there being a supporting plate 43 secured to the upper face of said beams. Mounted upon this plate is a turn-table 44, this turn-table or swinging carriage including a pair of oppositely-extending vertically-inclined beams 45, secured to the side faces thereof and serving as supports for the frame beams 46 of an elevator 47 connected thereto, the feed end of the elevator last mentioned being disposed, as will be understood, directly beneath the discharge end of the elevator 37. The elevator 47 is, in like manner, provided with a pair of oppositely-disposed shafts 48 and 49, each of which carries a pair of sprockets 50, over which the chains 51 of the slatted elevator 52 travel. This elevator, however, as shown in Fig. 3, stops short some distance from the far end of the beams 46, so as to provide an open space between said beams at such point, through which the hay or other material falls, when discharged from the elevator 52.

Journaled in a depending bracket secured to the under face of one of the beams 42 of the supplemental platform is a horizontal shaft 54 provided at its inner end with a beveled pinion 55, in mesh with a similar pinion 56, secured to the lower end of the vertical shaft 57, on which the turn-table 44 rotates. The opposite end of the shaft 57 is likewise provided with a beveled pinion 58, meshing with a similar pinion 59, mounted on the inner end of a horizontal shaft 60, journaled in the opposite sides of the body of the traveling carriage or turn-table, and projecting therebeyond at its outer end, being provided at such point with a belt pulley 61, connected by a crossed belt 62 with a belt pulley 63, secured to the projecting end of the shaft 49, which latter is further provided with a second pulley 64 connected by a belt 65 with a similar pulley 66, carried on the projecting end of a shaft 67, which extends transversely through the beams 46 of the elevator 47, at the outer end thereof.

The projecting outer end of the shaft 54 carried by the supplemental platform is further provided with a pair of pulleys 68 and 69, the latter of which is connected by a belt 70 with the pulley 40 carried upon one end of the shaft 34. The pulley 68 is connected by a belt 71 with any preferred source of power (not shown), and the shaft 54, upon which said pulley is mounted, thus serves as the main drive-shaft of the machine.

Loosely pivoted upon the opposite ends of the shaft 67, carried by the elevator 47 at its outer end, is a pair of depending links 72, whose opposite ends are connected by a shaft 73, upon which the frame beams 74 of the distributing elevator 75 are loosely mounted, the opposite ends of said beams being connected by a shaft 76, provided with a pair of sprockets 77, connected with the similarly arranged sprockets 78 carried by the shaft 73 by the chains 79 of the slatted elevator 80. One end of the shaft 73 carries a belt pulley 81 connected by a crossed-belt 82 with a second pulley 83, mounted upon the corresponding end of the shaft 67.

It will be apparent from the foregoing that when power is applied to the main drive-shaft 54, the several elevators will be driven one from another, owing to their belt connections, and it will be likewise apparent that when the hay or other material is deposited upon the horizontal elevator 23 from the wagon (not shown) it will be fed therealong onto the inclined elevator 17, and on reaching the discharge end thereof will fall upon the elevator 37, which is arranged transversely thereto, as shown. From the elevator 37 the hay will be fed onto the elevator 52, which extends into the loft of the barn or into the storage chamber, the conveyed material being carried therealong until it reaches the open space provided at the front end of the frame 47, through which space it falls onto the elevator 80 and is discharged therefrom and distributed within the storage chamber. It will likewise be understood from the foregoing that owing to the mounting of the elevator frame 47 upon the swinging carriage or turn-table 44, the said elevator frame may be turned so as to discharge at almost any point within the storage chamber. This adjustment of the discharge point of the elevator 52 is further augmented by the pivotal mounting of the frame carrying the elevator 80, this frame extending rearwardly beneath the frame 47 and being capable of an independent vertical movement with respect thereto. This movement of the frame 75 towards and from the frame 47 is effected by means of a pair of cables 84, the upper one of which is connected at one end with the eye-end of a rod 85 secured to one of the frame beams 74 towards the upper end thereof, said cable being passed over the notched upper end of an inclined rod 86, secured to one of the beams 46 of the frame 47, and over a pulley 87, carried by one of the inclined brace beams 45, the free end of said cable being within easy reach of the machine operator. The lower cable is, in like manner, secured at one end in an opening provided at one end of the cross beam 88, which connects the beams 74, said cable likewise being passed over the pulley above referred to and having its free end within reach of the operator. It will therefore be apparent that when tension is applied to the upper cable the distributing elevator and with it the elevator 80 will be swung upwardly away from the end of the frame 47; when, however, tension is applied to the lower cable the swinging frame will be moved in the opposite direction towards the under face of the frame 47. It will therefore be understood that the disposition of said swinging frame at different angles of inclination with respect to the discharge elevator, will cause the grain fed onto the distributing elevator therefrom to strike the latter at different angles and in consequence be distributed or discharged at different points. By reason therefore of the horizontal adjustment, of which the frame 47 is possible, and by reason of the supplemental vertical adjustment of the swinging frame with respect thereto, the hay or other material may be fed into almost any portion of the storage chamber, thus providing for its even distribution.

Further description of the machine and its operation is deemed unnecessary in view of the foregoing, it being understood that modifications and changes may obviously be made within the scope of the appended claims, without departing from the spirit of the invention, and it is not intended that the invention be limited to the exact details of construction shown and described.

What is claimed, is—

1. A machine of the class described comprising in combination, a supporting platform; a frame mounted on said platform and including a pair of spaced longitudinal sills; a pair of inclined elevators mounted on said sills at right angles to each other; a laterally extending supplemental platform carried by one of said sills; a turn-table carried by said supplemental platform; an elevator carried by said turn-table and movable bodily therewith, said last-mentioned elevator having its feed end disposed directly beneath the discharge end of the adjacent inclined elevator; and means for driving the several elevators one from another.

2. A machine of the class described comprising in combination, a supporting platform; a frame mounted upon said platform and including a pair of spaced longitudinal sills; an inclined elevator frame secured to one of said sills longitudinally thereof; a second elevator frame secured to said sills transversely thereof; the lower end of said last-mentioned frame being disposed directly beneath the upper end of said first-mentioned frame; a laterally-extending supplemental platform carried by the opposite sill; a turntable mounted thereon; an elevator frame carried by said turntable and movable bodily therewith in an approximately horizontal plane, the lower end of said movable elevator being disposed directly beneath the upper end of said transversely-extending frame; an elevator movable upon each of said frames; and means for driving the several elevators one from another.

3. A machine of the class described comprising in combination a supporting platform; a frame mounted on said platform and including a pair of spaced longitudinal sills; an inclined elevator frame secured to one of said sills longitudinally thereof; a second elevator frame secured to said sills transversely thereof, the lower end of said last-mentioned frame being disposed directly beneath the upper end of said first-mentioned frame; a laterally-extending supplemental platform carried by the opposite sill; a turntable mounted thereon; an elevator frame carried by said turntable and movable bodily therewith in an approximately horizontal plane, the lower end of said movable frame being disposed directly beneath the upper end of said transversely-extending frame; a vertically movable elevator frame pivoted to said horizontally movable frame, said vertically movable frame extending rearwardly beneath the latter and movable bodily therewith; an elevator movable upon each of said elevator frames; and means for driving the several elevators one from another.

4. A machine of the class described comprising in combination, a supporting platform; a frame mounted on said platform and including a pair of spaced longitudinal sills; an inclined elevator frame secured to one of said sills longitudinally thereof; a second elevator frame secured to said sills transversely thereof, the lower end of said last-mentioned frame being disposed directly beneath the upper end of said first-mentioned frame; a laterally-extending supplemental platform carried by the opposite sill, a turntable mounted thereon; an elevator frame carried by said turntable and movable bodily therewith in an approximately horizontal plane, the lower end of said movable frame being disposed directly beneath the upper end of said transversely-extending frame; a vertically movable elevator frame pivoted at its upper end to said horizontally movable frame, said vertically-movable frame extending rearwardly beneath the latter and movable bodily therewith; an elevator movable upon each of said elevator frames; means for driving the several elevators one from another; and means for raising and lowering said vertically movable elevator frames, to vary the points of discharge therefrom.

In testimony whereof, I affix my signature, in presence of two witnesses.

FRED. F. SOMMER.

Witnesses:
   A. MELLINGER, Sr.,
   R. C. SOMNERS.